US011938496B2

(12) United States Patent
Carta

(10) Patent No.: US 11,938,496 B2
(45) Date of Patent: Mar. 26, 2024

(54) DISPENSER FOR DISPENSING A FLUID

(71) Applicant: APTAR ITALIA S.P.A., San Giovanni Teatino (IT)

(72) Inventor: Lamberto Carta, Pescara (IT)

(73) Assignee: APTAR ITALIA S.P.A., San Giovanni Teatino (IT)

(*) Notice: Subject to any disclaimer, the term of this patent is extended or adjusted under 35 U.S.C. 154(b) by 144 days.

(21) Appl. No.: 17/789,433

(22) PCT Filed: Jan. 26, 2021

(86) PCT No.: PCT/IB2021/050572

§ 371 (c)(1),
(2) Date: Jun. 27, 2022

(87) PCT Pub. No.: WO2021/156702

PCT Pub. Date: Aug. 12, 2021

(65) Prior Publication Data

US 2023/0033171 A1 Feb. 2, 2023

(30) Foreign Application Priority Data

Feb. 7, 2020 (IT) ........................ 102020000002404

(51) Int. Cl.
*B05B 11/10* (2023.01)

(52) U.S. Cl.
CPC ...... *B05B 11/1035* (2023.01); *B05B 11/1067* (2023.01)

(58) Field of Classification Search
CPC ........................ B05B 11/1035; B05B 11/1067
See application file for complete search history.

(56) References Cited

U.S. PATENT DOCUMENTS 5,205,441 A * 4/1993 Andris .................. B05B 11/007 137/859
5,518,147 A * 5/1996 Peterson ............. B05B 11/1097 222/153.07

(Continued)

FOREIGN PATENT DOCUMENTS

EP 0 194 417 9/1986
JP 2012-507452 3/2012

OTHER PUBLICATIONS

International Search Report dated Apr. 28, 2021, for PCT/IB2021/050572, 3 pp.

(Continued)

*Primary Examiner* — Jeremy Carroll
(74) *Attorney, Agent, or Firm* — NIXON & VANDERHYE

(57) ABSTRACT

Described is a dispenser for dispensing a fluid contained in a plastic bottle, including a ring nut having a cylindrical conduit for sucking the fluid; a concertina-like deformable element including side walls defining a dosing chamber; a ring identifying with the ring nut a locking system defining an operating and non-operating configurations; a dispensing head, which can be pressed by a user and having a collection chamber collecting the fluid flowing from the dosing chamber through a central opening of the ring; first and second shutoff elements defining, respectively, a check valve at the inlet and a check valve at the outlet of the dosing chamber; a locking element interfering with at least one between the first and the second shutoff elements to lock it in the fixed position and thereby occlude the suction conduit and/or the central opening in a stable manner at least in a dispensing configuration.

20 Claims, 11 Drawing Sheets

(56) References Cited

U.S. PATENT DOCUMENTS

| | | | | |
|---|---|---|---|---|
| 5,664,703 | A | 9/1997 | Reifenberger et al. | |
| 6,536,630 | B1 | 3/2003 | Chan et al. | |
| 2004/0094578 | A1 * | 5/2004 | Bougamont | B05B 11/0064 222/209 |
| 2010/0116849 | A1 * | 5/2010 | Lautre | B05B 11/0029 222/207 |

OTHER PUBLICATIONS

Written Opinion of the International Searching Authority dated Apr. 28, 2021, for PCT/IB2021/050572, 6 pp.

* cited by examiner

DISPENSER FOR DISPENSING A FLUID

This application is the U.S. national phase of International Application No. PCT/IB2021/050572 filed Jan. 26, 2021, which designated the U.S. and claims priority to IT 102020000002404 filed Feb. 7, 2020, the entire contents of each of which are hereby incorporated by reference.

BACKGROUND OF THE INVENTION

Field of the Invention

This invention relates to a dispenser for dispensing fluid. In other words, the invention relates to a dispensing device applicable to the neck of a bottle in order to dispense the fluid contained in the bottle.

Description of the Related Art

There are various types of prior art dispensers, from those which are structurally complex to those which are structurally simpler.

Disadvantageously, these devices are often made of materials different from those of the bottles to which they are coupled and a user who is not very careful might not separate the dispenser from the bottle when disposing of the waste. In this way the recycling of the two components is not efficient and, especially when arriving in an area for sorting the waste, requires lengthy sorting times.

Generally speaking, the use of dispensers is known which are equipped with a simple structure and therefore with a reduced number of components so as to have environmentally-sustainable products equipped with homogeneous material in such a way as to simplify the recycling.

Of these, dispensers are commonly known which are based on concertina-like deformable elements which act as spring and delimit the dispensing chamber for the fluid flowing out. These elements may also integrate the non-return valves which regulate the infeed and outfeed of the fluid from the dosing chamber by suitably opening for specific pressure differences, with the advantage of reducing to a maximum the number of components used and the corresponding materials.

Disadvantageously, dispensers with this simplified structure do not have compensating systems and are not therefore able to top-up with air the volume of fluid extracted from the bottle as they are generally used for systems which do not require it.

Above all, another drawback of these dispensers is due to the fact that some components, especially those which integrate various functions, have a poor versatility of use, and if they are designed to optimise the performance on the basis of the characteristics of a specific fluid to be dispensed, they are often unable to guarantee an adequate operation in the case of use of the dispenser with a fluid having different characteristics.

Moreover, prior art dispensers require certain construction specifications in order to allow the transport in safety, which is a feature disadvantageously missing in the above-mentioned simplified structures.

SUMMARY OF THE INVENTION

The technical purpose of the invention is therefore to provide a dispenser for dispensing a fluid which is able to overcome the drawbacks of the prior art.

The aim of the invention is therefore to provide a dispenser for dispensing fluid which has a simplified structure which can be used in systems which require the presence of a compensation system for topping-up the volume of fluid extracted.

A further aim of the invention is to provide a dispenser for dispensing fluid which has a degree of robustness such that it can be dispatched without particular protective devices.

A further aim of the invention is to provide a dispenser for dispensing fluid which has features such as to allow recycling in a safe fashion.

A further aim of this invention is also to provide a dispenser for dispensing fluid which allows a versatility of use of the dispenser with any type of fluid.

The technical purpose indicated and the aims specified are substantially achieved by a dispenser for dispensing a fluid comprising the technical features described in one or more of the appended claims. The dependent claims correspond to possible embodiments of the invention.

In particular, the technical purpose specified and the aims specified are substantially achieved by a dispenser for dispensing a fluid, made of plastic material.

The dispenser comprises a ring nut which can be screwed on the neck of a bottle and having a cylindrical element defining a conduit for sucking fluid from the bottle, where the cylindrical element has a neck.

Moreover, the ring nut has a series of holes, positioned around the conduit, and an inner cylindrical wall equipped with partial grooves.

The dispenser also comprises a concertina-like deformable element, defining a return spring of the dispenser, comprising a cylindrical lower projection equipped with relative partial grooves and side walls defining a dosing chamber of the dispenser.

The dispenser comprises a ring positioned on the ring nut and designed to define with the ring nut a locking system which is able to define an operating configuration, in which the dispenser can be actuated, and a non-operating configuration of the dispenser, in which the dispenser cannot be actuated, by means of a reciprocal rotation of the ring and the ring nut.

The ring is also coupled to an upper portion of the concertina-like deformable element in such a way as to pull the concertina-like deformable element during the reciprocal rotation in such a way as to align or misalign the partial grooves of the cylindrical wall of the ring nut and the partial grooves of the concertina-like deformable element in such a way as to open or close, respectively, a passage through which the outside air can enter into the bottle through a conduit which is separate and different to the conduit for dispensing the fluid, for compensating the reduction in the volume of liquid in the bottle as it is gradually emptied.

The dispenser also comprises a dispensing head, which can be pressed by a user when the dispenser is in the operating configuration, operatively connected to the ring and equipped with a channel designed to collect the fluid at the outlet from the dosing chamber of the concertina-like deformable element through a central opening of the ring in such a way as to dispense it through an outlet channel.

The dispenser comprises a first shutoff element configured to rest on the neck of the cylindrical element of the ring nut and rise in the case of negative pressures of the dosing chamber in such a way as to form, together with the neck, a check valve for the fluid at the infeed of the fluid in the dispensing chamber. Further, the dispenser comprises a second shutoff element integral with the dispensing head and housed movably in the central opening of the ring to rise in the case of positive pressures of the dosing chamber following the actuation of the dispensing head, in such a way as to define a check valve operating on the delivery of the fluid from the dosing chamber to the collection chamber of the dispensing head.

Lastly, the dispenser comprises a sleeve element, coaxial with the cylindrical element of the ring nut, interfering, at least in a dispensing configuration before a first pressure of the dispensing head, with at least one between the first and second shutoff element in such a way as to lock it in a fixed position which allows the suction conduit and/or the central opening to be stably occluded.

Further features and advantages of the invention are more apparent in the non-limiting description which follows of a non-exclusive embodiment of a dispenser for dispensing a fluid.

BRIEF DESCRIPTION OF THE DRAWINGS

The description is set out below with reference to the accompanying drawings which are provided solely for purposes of illustration without restricting the scope of the invention and in which.

DESCRIPTION OF THE PREFERRED EMBODIMENTS

With reference to the accompanying drawings, the numeral 1 denotes in its entirety a dispenser for dispensing a fluid which, for simplicity of description, will be referred to hereafter as the dispenser 1.

The dispenser 1 is made of plastic material in such a way as to simplify the recycling. Preferably, the dispenser 1 is made of polyethylene. Even more preferably, the plastic material is a biological plastic produced from non-fossil sources. In other words, the components from which the dispenser 1 is made are sized in such a way as to be made from a single plastic family (for example, polyethylene) so that it can also be recycled together with bottles which, when not transparent, are also made of polyethylene. Advantageously, in the polyethylene family there are the above-mentioned biological plastics (made from non-fossil sources) which are particularly recyclable and/or biodegradable.

The dispenser 1 comprises a ring nut 2 which can be screwed onto the neck of a bottle (not illustrated).

Figure 3B:
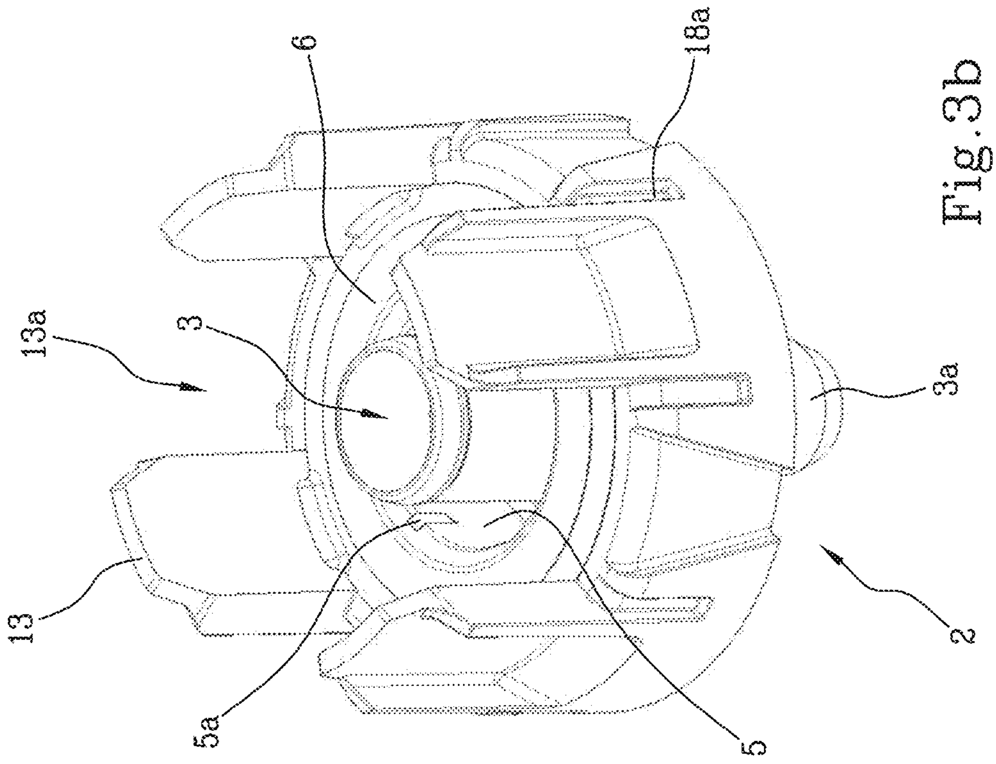
FIGS. 3*a* to 8 are schematic representations of components of the dispenser of FIG. 2.
Figure 3A:
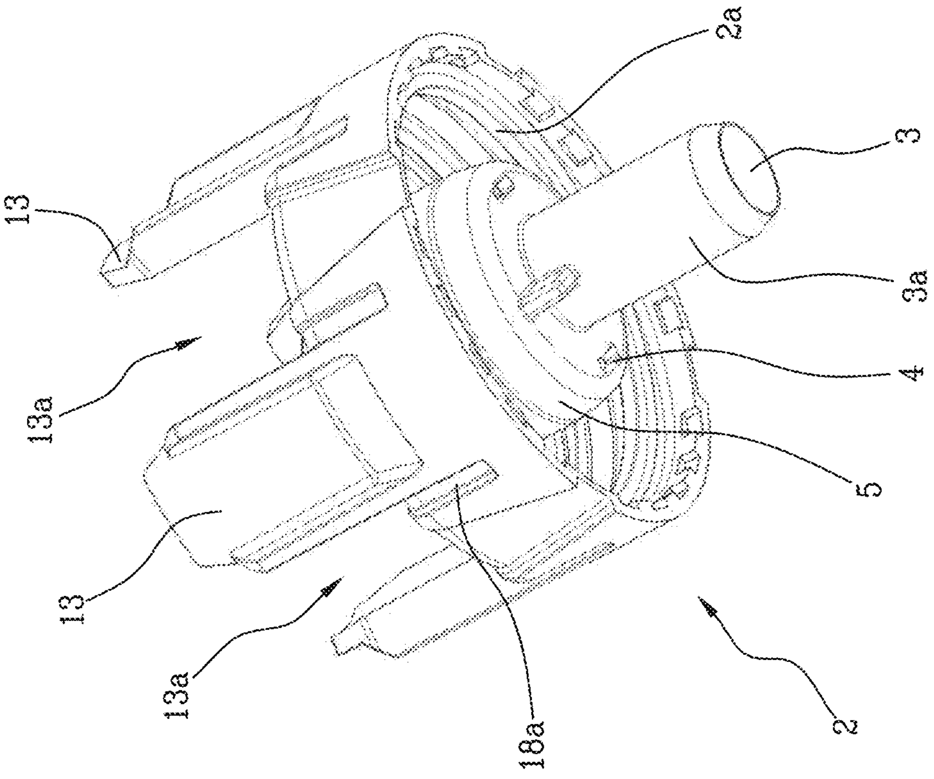
Figure 4B:
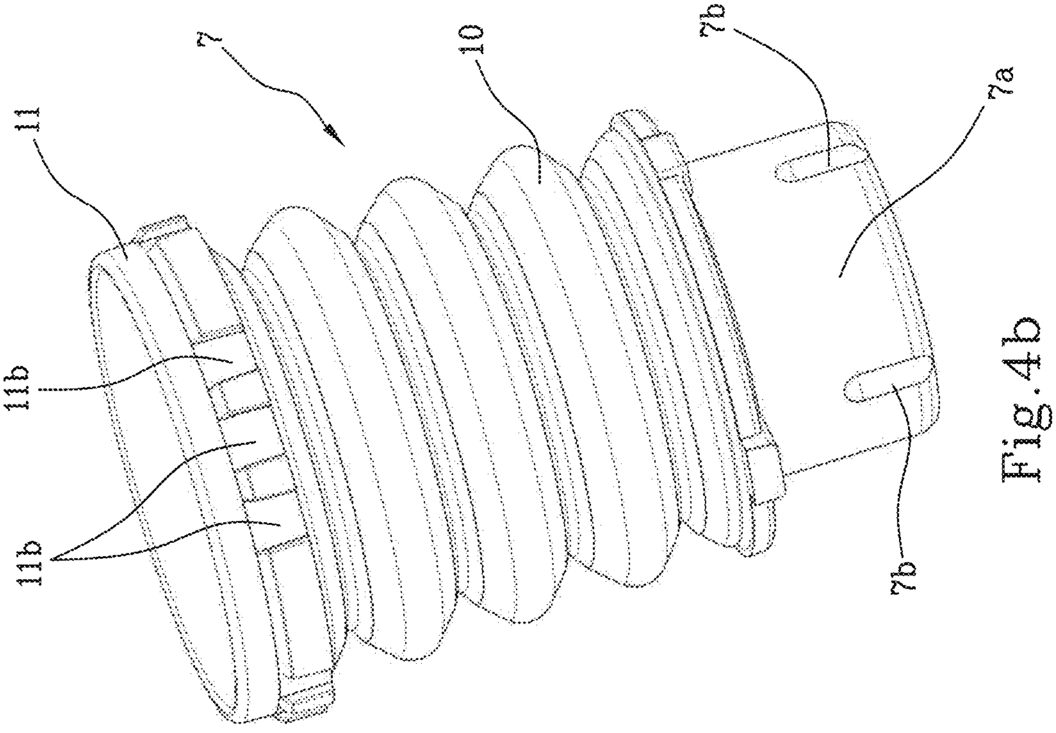
Figure 4A:
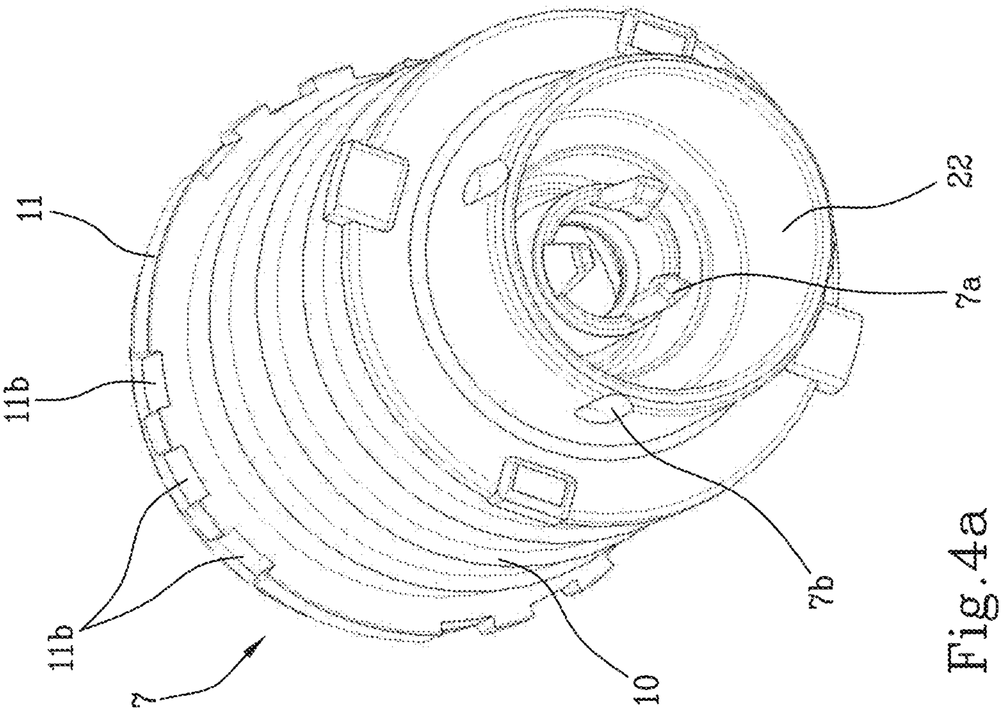

The ring nut 2 (illustrated in FIGS. 3*a* and 3*b*) is equipped with a coupling system preferably threaded. The accompanying drawings show the fastening system 2*a* made as a cylinder (defining the main body of the ring nut 2) equipped internally with a thread designed to allow the screwing to the neck of the bottle. The threaded fastening system 2*a* may be replaced by other coupling systems (not illustrated) for bottles.

The ring nut 2 has a cylindrical element 3*a*, suitably shaped internally, forming a conduit 3 for sucking the fluid. The conduit 3 is positioned in a central portion of the ring nut 2 and is designed to allow the coupling of the draw-up (not illustrated) for sucking the fluid from the bottle.

As shown in the accompanying drawings, the cylindrical element 3*a* has a neck 3*b*.

The neck 3*b*, preferably substantially having the shape of a circular ring, partly occludes the conduit 3.

The neck 3*b* is designed to interface with a first shutoff element 20. The first shutoff element 20 may preferably be made with a substantially spherical shape.

In particular, the first shutoff element 20 is configured to be positioned resting on the neck 3*b* and to rise from it in such a way as to make together with the neck 3*b* a fluid check valve, as will be described in more detail below. In other words, the first shutoff element 20 may be made with any shape useful for making the above-mentioned check valve.

The ring nut 2 also comprises a series of holes 4 positioned around the conduit 3 (that is, around the cylindrical element 3*a*). The holes 4 are made in such a way as to allow the passage of the compensation air, as described in detail below.

The ring nut 2 also comprises a cylindrical inner wall 5 coaxial with the cylindrical element 3*a* (that is, the conduit 3). In other words, the cylindrical wall 5 delimits the portion of the ring nut 2 having the conduit 3 and the holes 4. Preferably, as shown in the accompanying drawings, the conduit 3, the holes 4 and the cylindrical wall 5 are coaxial with each other. In particular, the holes 4 are distributed on the perimeter of the conduit 3 and the cylindrical wall 5 surrounds and contains the conduit 3 (that is, the cylindrical element 3*a*) and the holes 4. The elements just described are positioned inside the walls of the main body of the ring nut 2 (which, as described above, have a substantially cylindrical shape).

The cylindrical wall 5 is also equipped with partial grooves 5*a* the function of which is described in detail below.

Lastly, the ring nut 2 is equipped with a flat annular portion 6 which connects the cylindrical wall 5 with the outer walls of the main body of the ring nut 2 equipped with the fastening system 2*a*. The flat annular portion 6 is designed to house a sealing gasket (not illustrated).

Figure 1:
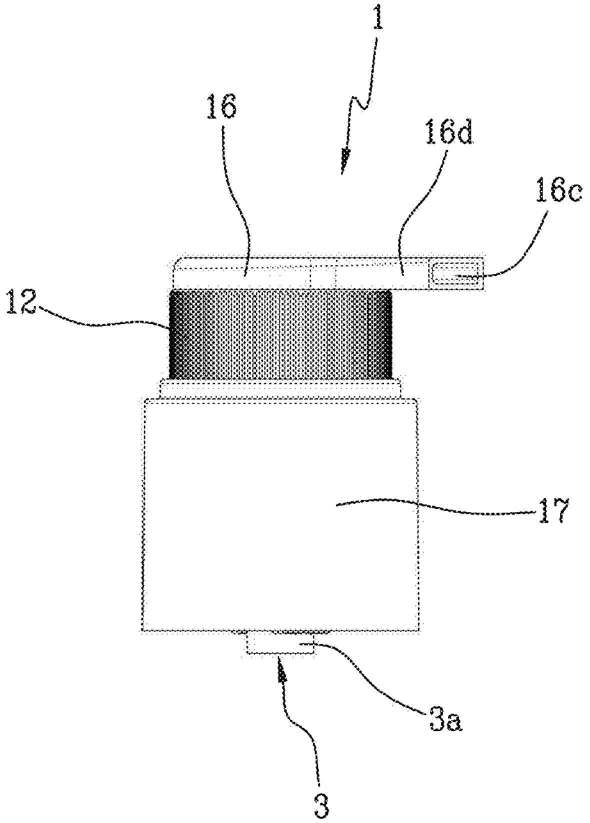
FIG. 1 is a schematic outside view of a dispenser according to the invention.
Figure 2:
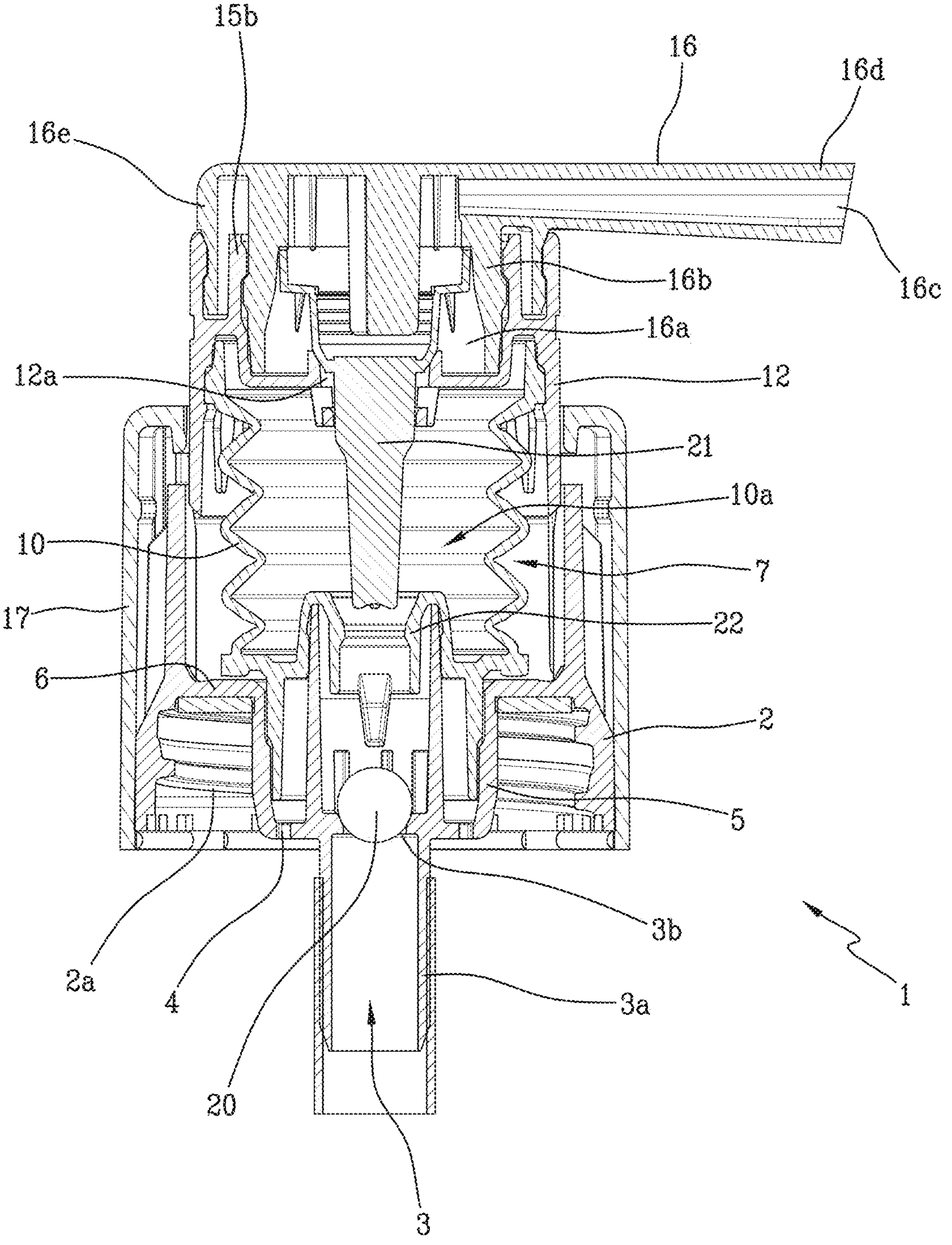
FIG. 2 is a schematic view of a transversal cross-section of an embodiment of the dispenser.

In the embodiment illustrated in FIG. 2, with reference to the components of FIGS. 3*a* to 8, the dispenser 1 also comprises a collar 17 (shown in FIG. 8) connected to the ring nut 2 in such a way as to transmit the rotational motion. The collar 17 and the ring nut 2 are connected to each other by portions 18*a* and 18*b* shaped to match each other. The portions 18*a* and 18*b* have a mainly axial extension.

The collar 17 and the ring nut 2 are designed to define an end of stroke for the dispensing head 16. The collar 17 is also equipped with a relative undercut 17*a* (defined in a lower portion of the collar 17) designed to improve the connection between the collar 17 and the ring nut 2.

According to an embodiment not illustrated, the dispenser 1 may not be equipped with the collar 17.

The dispenser 1 is also equipped with a concertina-like deformable element 7 (illustrated in FIGS. 4*a* and 4*b*), defining a return spring of the dispenser 1.

The concertina-like deformable element 7 comprises a lower cylindrical projection 7*a* equipped with relative partial grooves 7*b*. The partial grooves 7*b* of the concertina-like deformable element 7 correspond to as many partial grooves 5*a* of the ring nut 2. In this way, in an operating configuration of the dispenser 1 (that is, a configuration designed to allow the actuation of the dispenser and the consequent dispensing of the fluid), the partial grooves 5*a* and 7*b* are superposed and define a channel for the passage of the compensation air. On the other hand, when the dispenser is in a non-operating configuration, in which it is not possible to perform the actuation, the partial grooves 5*a* and 7*b* are offset in such a way as to interrupt the passage channel and prevent part of the fluid from escaping from the inside of the bottle through the air infeed conduit.

The concertina-like deformable element 7 is also equipped with side walls 10 which define a dosing chamber 10*a* of the dispenser 1. The side walls 10 constitute deformable elements designed to define the return spring of the dispenser 1.

In use, the pressure inside the dosing chamber 10*a* allows control of the first shutoff element 20 described above, and in particular of its movement.

More specifically, the first shutoff element 20 is configured to be positioned resting on the neck 3*b* and to rise in the case of negative pressures of the dosing chamber 10*a*, thus allowing the extraction of the fluid from the bottle.

Also, when it closes against the neck 3*b*, the first shutoff element 20 occludes the conduit 3, preventing the fluid from returning from the dosing chamber 10*a* to the bottle.

In this way, the shutoff element 20 forms, together with the neck 3*b*, a non-return valve for the fluid at the infeed of the dosing chamber 10*a*.

For this reason, the first shutoff element 20 may be made with any shape which allows the occlusion of the neck 3*b* and which therefore allows the opening and closing of the check valve described above as a function of the pressures exerted on the first shutoff element 20. In the embodiment of FIG. 2, for example, this shape is the above-mentioned substantially spherical shape.

Figure 5B:
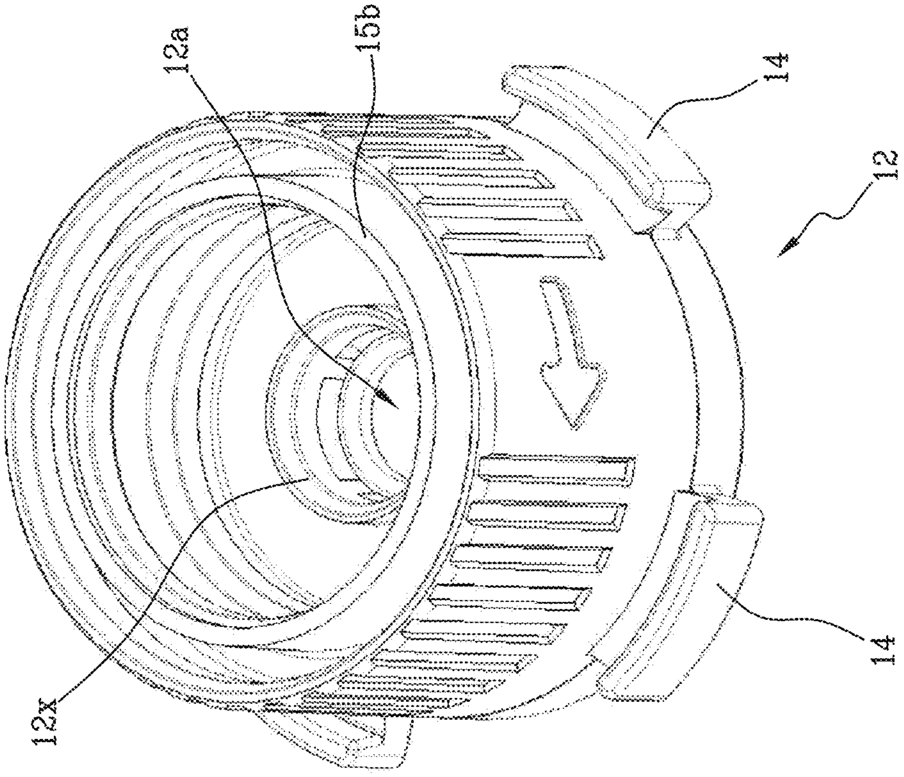
Figure 5A:
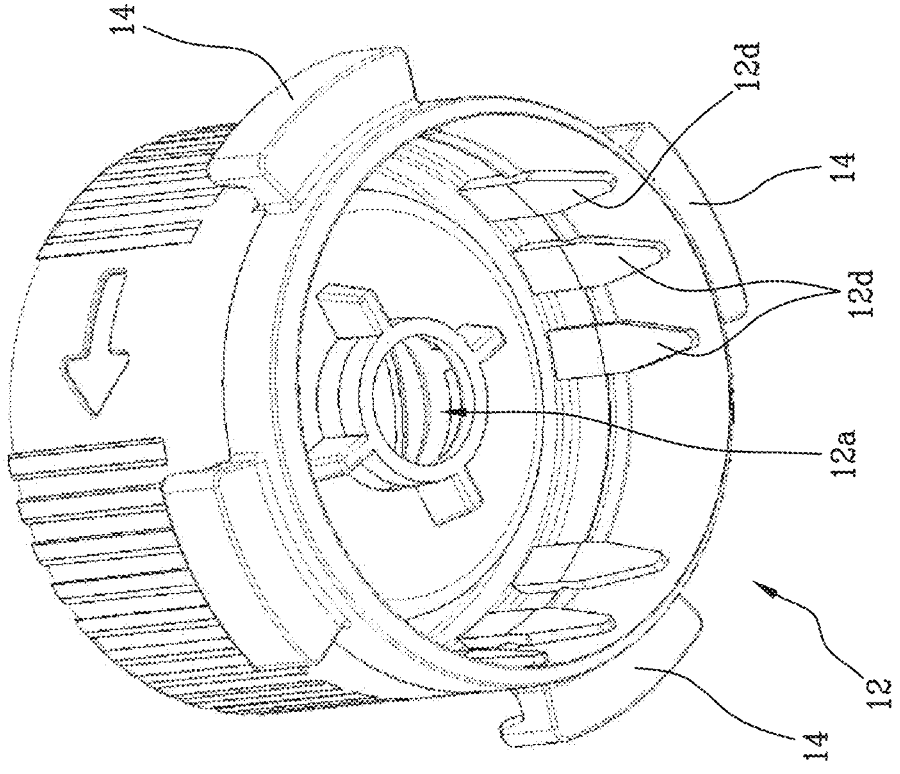
Figure 6:
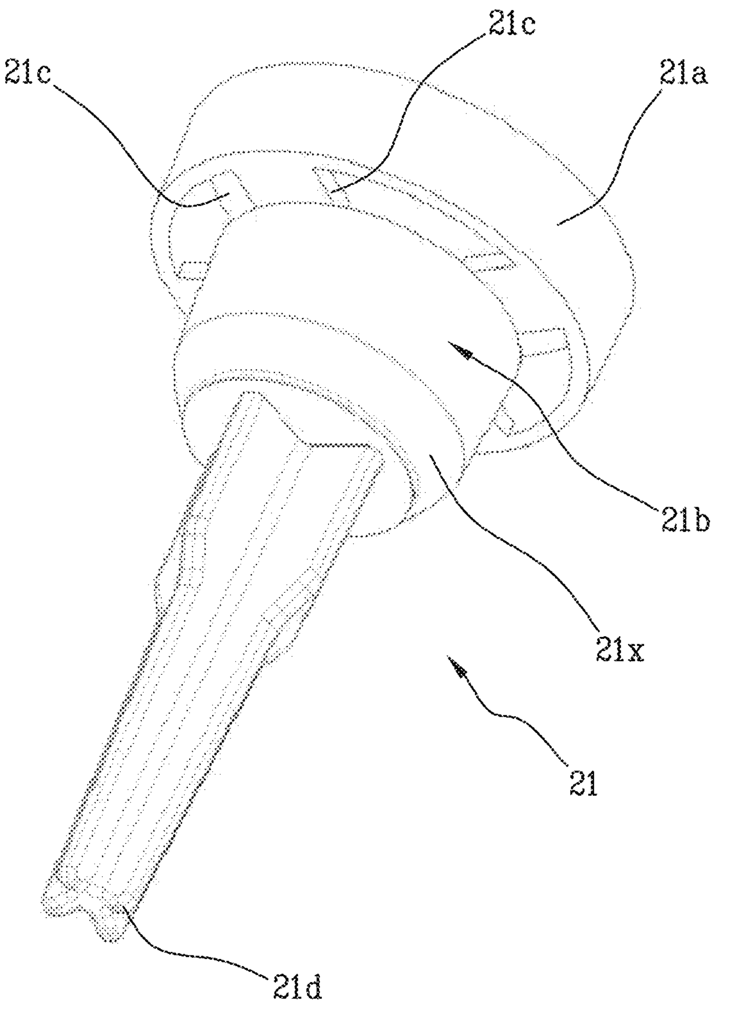
Figure 8:
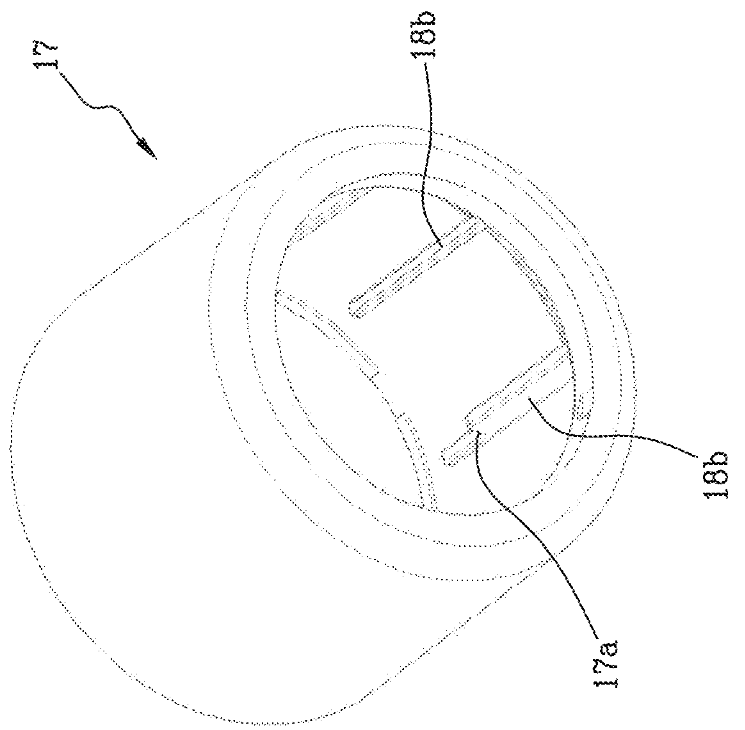
Figure 7:
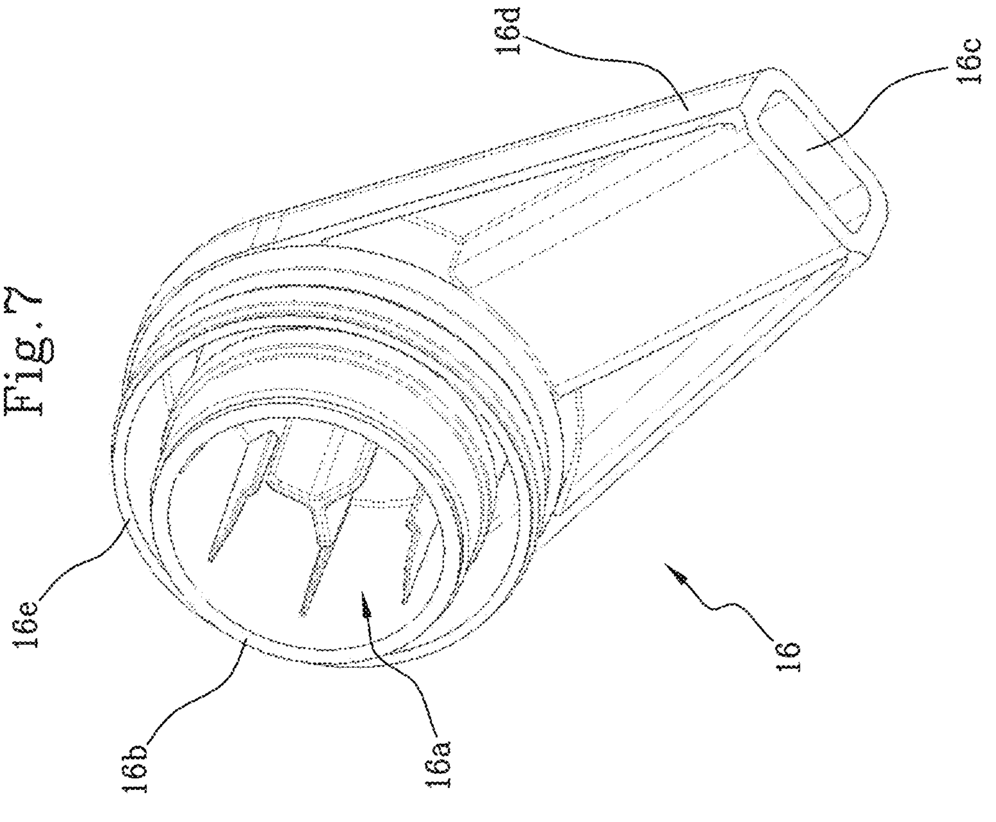

The concertina-like deformable element 7 has an upper portion 11 configured to be coupled to a ring 12 (illustrated in FIGS. 5*a* and 5*b*).

The ring 12 is located on the ring nut 2 and configured to define with the ring nut 2 a locking system designed to define an operating configuration and a non-operating configuration of the dispenser 1.

The term "operating configuration" means a configuration wherein the dispenser 1 can be actuated and is able to dispense the fluid drawn from the bottle.

The term "non-operating configuration" means a configuration wherein the dispenser 1 cannot be actuated and is therefore not able to dispense the fluid.

In particular, the ring 12 is able to define the two above-mentioned configurations by means of a reciprocal rotation between the ring 12 and the ring nut 2.

With reference to the locking system, it consists of inner axial ribs 13 positioned in an upper portion of the ring nut 2 and outer radial extensions 14 of the ring 12. The outer radial extensions 14 are located in a lower portion of the ring 12, close to the ring nut 2. In this way, in the non-operating configuration of the dispenser 1, the outer radial extensions 14 rest on the inner axial ribs 13 in such a way as to prevent operation of the dispenser 1.

The inner axial ribs 13 are distributed in such a way as to define channels 13*a* alternated with the inner axial ribs 13. The channels 13*a* are dimensioned in such a way as to allow a sliding of the outer radial extensions 14 of the ring 12.

In the accompanying drawings the ring nut 2 is equipped with four inner axial ribs 13 and four channels 13*a* and the ring 12 is equipped with four outer radial extensions 14. In other words, a predetermined number of inner axial ribs 13 correspond to as many outer radial extensions 14 and channels 13*a* to guarantee the correct operation of the locking system for the actuation (or not) of the dispenser 1.

The ring 12 is hooked to the upper portion 11 of the concertina-like deformable element 7. The upper portion 11 of the concertina-like deformable element 7 is equipped with lateral grooves 11*b*. The grooves 11*b* are located in outer portions of the concertina-like deformable element 7 (where "outer" means that they are not facing the dosing chamber 10*a*) and are designed to allow the connection of the upper portion with the ring 12. In this way, rotating the ring 12 allows the transmission of the rotational motion to the concertina-like deformable element 7. In particular, the ring 12 is equipped with suitable ribs 12*d* designed to be inserted in the lateral grooves 11*b* of the concertina-like deformable element 7 in such a way as to allow the concertina-like deformable element 7 to be pulled during rotation.

In this way it is possible to pull the concertina-like deformable element 7 during the reciprocal rotation in such a way as to align or misalign the partial grooves 5*a* of the cylindrical wall 5 of the ring nut 2 and the partial grooves 7*b* of the concertina-like deformable element 7.

In this way, when the dispenser 1 is in the operating configuration, the partial grooves 5*a* and 7*b* define the channel for passage of the compensation air defining a flow of air with the holes 4 of the ring nut 2 to obtain the compensation.

On the other hand, when the dispenser 1 is in the non-operating configuration, the partial grooves 5*a* and 7*b* are not alongside each other and do not define the channel for the passage of the compensation air.

The ring 12 is operatively connected to a dispensing head 16 (illustrated in FIG. 7) which can be pressed by a user when the dispenser 1 is in the operating configuration.

When the dispenser 1 is in the operating configuration, the actuation of the dispensing head 16 is allowed by the fact that the outer radial extensions 14 of the ring 12 can slide inside the channels 13*a* of the ring nut 2.

In the non-operating configuration, on the other hand, the outer radial extensions 14 rest on the inner axial ribs 13 in such a way as to prevent the actuation of the dispensing head 16.

The dispenser 1 can therefore be controlled by a user in such a way as to allow the dispensing head 16 to adopt an operating configuration and a non-operating configuration.

The term "operating configuration" means a configuration of the dispensing head 16, when the dispenser 1 is in the operating configuration, wherein it is pressed and consequently moved from a raised position to a lowered position relative to the bottle in such a way that the fluid is dispensed by the dispenser 1.

Moreover, the term "non-operating configuration" means a configuration of the dispensing head 16, both when the dispenser 1 is in the operating configuration and when it is in the non-operating configuration, in which the head is left still in the raised position relative to the bottle (in other words, the dispensing head 16 is not pressed and the fluid is not dispensed).

In particular, the dispensing head 16 is equipped with a collection chamber 16*a* designed to collect the fluid flowing out from the dosing chamber 10*a* of the concertina-like deformable element 7 through a central opening 12*a* which places in communication the dosing chamber 10*a* and the collection chamber 16*a*.

The central opening 12*a* is configured to define, together with a second shutoff element 21 a further non-return valve which operates on the delivery of the fluid from the dosing chamber 10*a* to the collection chamber 16*a*.

In other words, when the dispenser 1 is in the operating configuration, the delivery valve is configured for opening in the case of a pressure of the dosing chamber 10*a* greater than a predetermined threshold value, and therefore as a result of the thrust exerted on the dispensing head 16 by a user (and therefore in the case of operation), and, on the other hand, to remain closed in the other conditions.

More specifically, the second shutoff element 21 (illustrated in FIGS. 6, 10*b* and 11*b*) is integral with the dispensing head 16 and is movably housed in the central opening 12*a* of the ring 12.

As shown in the accompanying drawings, the second shutoff element 21 has substantially three portions.

In particular, it has an anchoring portion 21*a*, preferably annular, designed to be stably received in a receiving portion of the dispensing head 16 in such a way as to make the second shutoff element 21 integral with the dispensing head 16.

Moreover, the second shutoff element 21 has a sealing portion 21*b*, having a substantially elongate shape and designed to occlude the central opening 12*a*, forming a closed configuration of the delivery valve.

The second shutoff element 21 also has a connecting portion 21*c*, joining the sealing portion 21*b* to the anchoring portion 21*a* and configured to allow the movement, by elastic deformation, of the sealing portion 21*b* relative to the anchoring portion 21*a* in such a way as to open the delivery valve in the case of a pressure of the dosing chamber 10*a* greater than the predetermined threshold value.

In other words, if the dispensing head 16 is operated, the second shutoff element 21 is moved together with the dispensing head 16 in such a way that the pressure of the dosing chamber 10*a* allows a raising of the sealing portion 21*b* of the shutoff element 21, opposite to the lowering movement of the latter so as to allow an adequate opening of the delivery valve. This movement is allowed by the elastic nature of the connecting portion 21*c* which, following the above-mentioned pressure, allows lifting of the sealing portion 21*b* suitable for allowing the passage of the fluid.

On the contrary, under the other conditions, that is to say, when the dispensing head 16 is released following operation, or when it is in the raised rest condition, the second shutoff element 21, and in particular the sealing portion 21*b*, rest against the central opening 12*a*, adhering to it and occluding it, so as to prevent the liquid from flowing backwards during release of the dispensing head and also accidental escape of the liquid if the dispenser is not used.

More in detail, in the configuration illustrated, the sealing portion 21*b* preferably has a substantially conical lower portion 21*x* having dimensions suitable for occluding an upper portion 12*x*, also conical, of the central opening 12*a* when the sealing portion 21*b* is in the lowered position. On the other hand, when the sealing portion 21*b* is in the raised position, due to the pressure of the liquid, the conical lower portion 21*x* is detached from the upper portion 12*x* of the central opening 12*a* allowing the passage of liquid.

Structurally, the connecting portion 21*c* comprises a plurality of thread-like elements or tabs which join the anchoring portion 21*a* to the sealing portion 21*b*.

The thread-like elements or tabs are spaced from each other in such a way as to allow the fluid to pass through.

By collecting the fluid by the collection chamber 16*a*, the dispenser 1 (that is, the dispensing head 16) is able to dispense the fluid through an outlet channel 16*c* of the fluid. The outlet channel 16*c* is made in the form of a spout 16*d*. Preferably, the spout 16*d* is a flexible spout designed to withstand breakages or also removal of the dispensing head 16 due to impacts or other types of stress.

The dispensing head 16 is also equipped with an inner cylindrical projection 16*b* to which the ring 12 is coupled by means of a second undercut 15*b* of the ring 12.

Preferably, the anchoring portion 21*a* of the second shutoff element 21 is connected to an inner wall of the cylindrical projection 16*b* of the dispensing head 16. In other words, the second shutoff element 21 is preferably integral with the inner cylindrical projection 16*b* of the dispensing head 16.

Preferably, the dispensing head 16 can rotate relative to the ring 12 without the latter being pulled during the rotation of the dispensing head 16. Other configurations are possible wherein the dispensing head 16 is fixed relative to the ring 12.

The dispensing head 16 is also equipped with a sealing wall 16*e* designed to seal the dispensing head 16 keeping the two components stably coupled, further reducing the risk of accidental removal and making the dispenser 1 structurally more secure.

In use, the actuation of the dispensing head 16 causes a deformation of the concertina-like deformable element 7 with consequent increase in the pressure inside the dosing chamber 10*a* (due to a reduction in volume) which determines the dispensing of the fluid. In this context, the partial grooves 5*a* and 7*b* and the rest of the channels described above allow the selective passage of the air from the outside towards the inside of the bottle.

In other words, the particular structural shape of the concertina-like deformable element 7 and of the ring nut 2 is such that, once the dispenser 1 has been moved to the operating configuration, a duct is formed for compensating the air through which the air can pass inside the bottle in order to top-up the quantity of fluid coming out from the bottle following operation of the dispenser 1. In particular, the duct mentioned above is outside the dosing chamber 10*a* and is delimited between the walls 10 of the concertina-like deformable element 7 and by the ring nut 2 and the ring 12.

The path of the air flow is thus defined between the gap exiting between the collar 17 and the ring 12 between the ring nut 2 and the ring 12 and the series of holes 4 passing outside the concertina-like deformable element 7 and through the channel for the passage of the compensation air defined by the partial grooves 5*a* and 7*b*.

In order to improve the hermetic seal of the dispenser 1, that is to say, in order to ensure that the fluid does not pass through the conduit 3 and/or the central opening 12*a* when it is not necessary, thereby preventing it from being dispensed by the outlet channel 16*c* in the situations where such dispensing is not required, the dispenser 1 is equipped with a sleeve element 22.

The sleeve element 22 is coaxial with the cylindrical element 3*a*.

In particular, the sleeve element 22 may be made as a single element (FIG. 10*a*) or it may be made as one piece, or connected or connectable to the concertina-like deformable element 7 (FIGS. 2, 9 and 11*a*) or to the ring nut 2.

The sleeve element 22 interferes, at least in a dispensing configuration before a first pressing of the dispensing head 16, with at least one between the first and the second shutoff elements 20, 21 in such a way as to occlude the conduit 3 and/or the central opening 12*a*.

The expression “dispensing configuration” means a condition of pre-use of the dispenser 1. In other words, this is a configuration of the dispenser 1 once the dispenser 1 is manufactured, mounted or purchased by a consumer. In other words, the dispensing configuration is a configuration wherein the dispenser 1 has never been actuated.

Preferably, also, in this dispensing configuration, the dispenser 1 is in the non-operating configuration, that is, in the configuration wherein the dispenser 1, and in particular the dispensing head 16, cannot be actuated.

A first embodiment of the sleeve element 22 is illustrated in FIG. 2.

In this non-limiting example embodiment, the sleeve element 22 is located at least partly inside the cylindrical element 3*a*.

Figure 9:
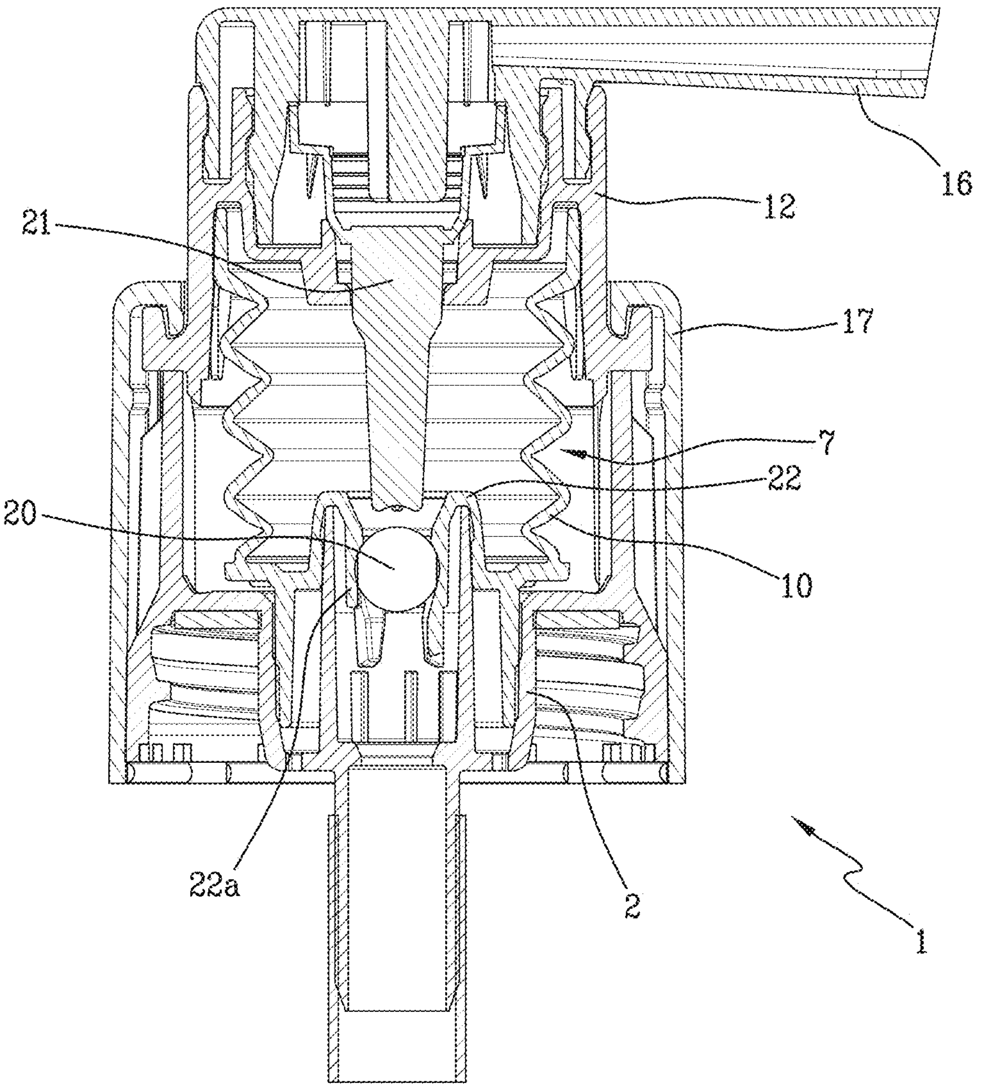
FIG. 9 is a schematic cross-section view of a configuration of dispensing of the dispenser of FIG. 2.

In the dispensing configuration, the dispenser 1 has the first shutoff element 20 retained by interference by the sleeve element 22 as illustrated in FIG. 9.

In other words, the first shutoff element 20, in the supply configuration, is housed in a portion 22*a* shaped to match the first shutoff element 20 of the sleeve element 22.

The portion 22*a* shaped to match is shaped in such a way as to surround partly, in a stable fashion and adherent to the first shutoff element 20.

In this way, the first shutoff element 20 stably occludes the conduit 3, stopping the passage of liquid in both directions, thus preventing the fluid from rising from the bottle to the dosing chamber 10*a*.

For example, in the accompanying drawings the first shutoff element 20 has a substantially spherical shape and the sleeve element is substantially cylindrical in shape sized in such a way that the portion 22*a* shaped to match can retain the spherical element by interference.

Upon the first actuation of the dispenser 1, the first shutoff element 20 is pushed by the second shutoff element 21. In this way, the first shutoff element 20 is moved away from the sleeve element 22 in such a way as to be pushed towards the neck 3*b*.

In other words, the second shutoff element 21, during a first pressure of the dispensing head 16, is configured to irreversibly push the first shutoff element 20 from the sleeve element 22 to the neck 3*b*.

In this context, the sealing portion 21*b* of the second shutoff element 21, preferably having a bottom head 21*d*, slides during actuation at least partly in the conduit 3 entering into contact with the first shutoff element 20, forcing it to release from the portion 22*a* shaped to match of the sleeve element 22 and to be positioned resting on the neck 3*b* of the cylindrical element 3*a*. The portion 22*a* shaped to match is preferably configured to deform (plastically or elastically) in such a way as to free the first shutoff element 20 when it is pushed by the second shutoff element 21.

Advantageously, therefore, in the supply configuration, the sleeve element 22, acting in conjunction with the first shutoff element 20, makes the dispenser 1 hermetically sealed, preventing the fluid, contained in the bottle, from reaching the dosing chamber 10*a*.

Advantageously, moreover, the non-operating configuration prevents the dispensing head 16 from being pressed in such a way as to prevent first undesired activations of the dispenser 1 allowing safe dispatch of the dispenser 1 without the use of special and expensive protective measures.

Figure 11B:
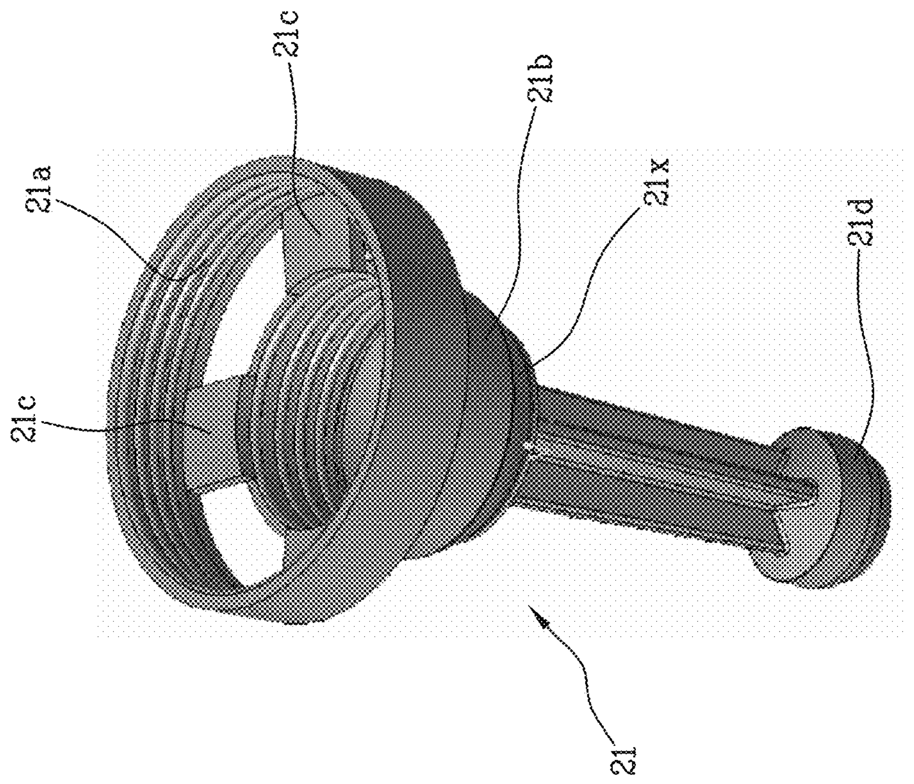
FIGS. 11*a* and 11*b* are schematic representations of a further embodiment of a dispenser according to the invention.
Figure 11A:
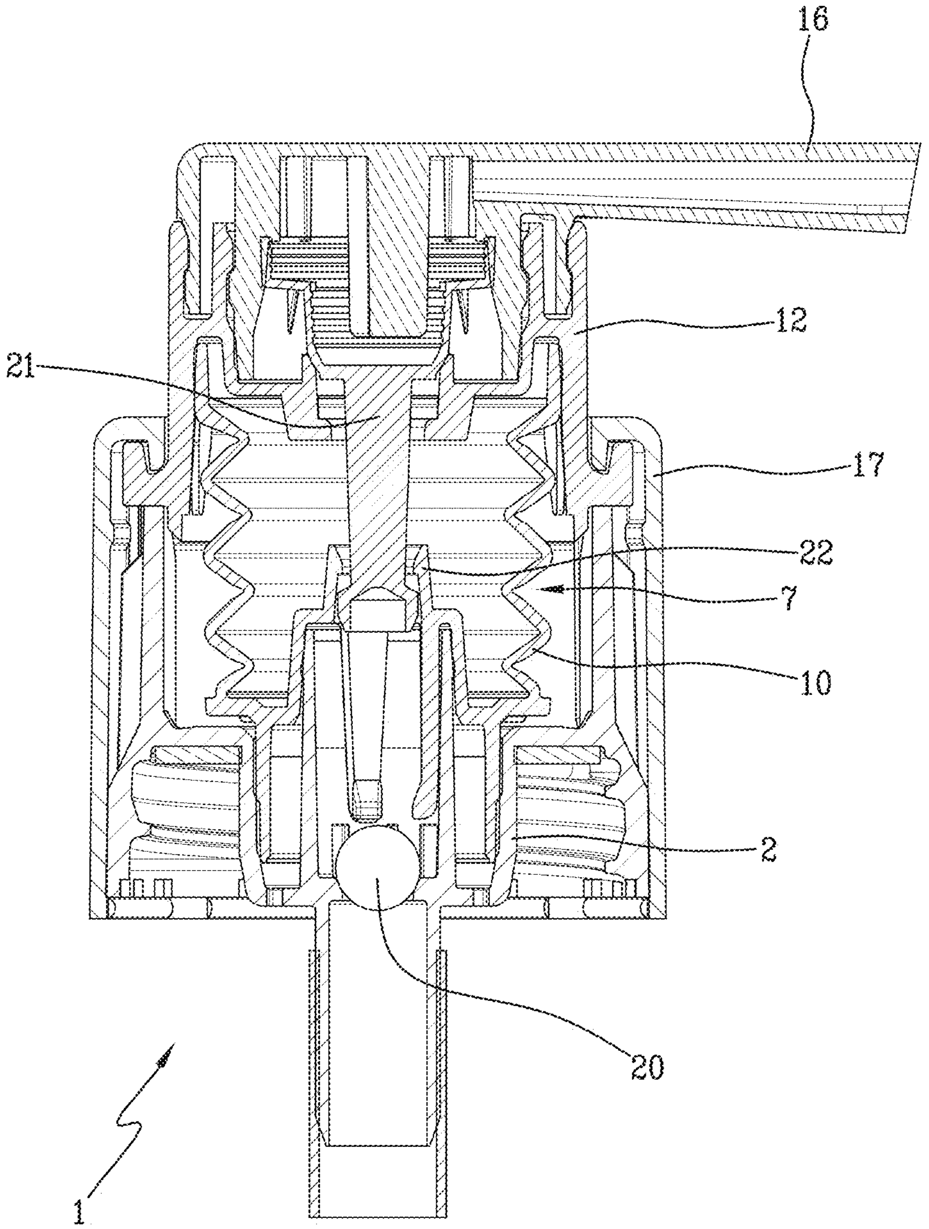

According to a further non-limiting example embodiment illustrated in FIGS. 11*a* and 11*b*, the second shutoff element 21 has a bottom head 21*d* which radially interferes with a portion of the sleeve element 22 for selectively sealing the conduit 3 in the non-operating configuration of the dispensing head 16. In other words, the portion of the sleeve element 22 is shaped to match the bottom head 21*d* in such a way as to seal the conduit 3 and at the same time ensure that, in the non-operating configuration, the sealing portion 21*b* is locked in the closed configuration which occludes the central opening 12*a* defining, in effect, two hermetic seals along the path from which the fluid passes during actuation of the dispenser 1.

In other words, the sleeve element 22, acting in conjunction with the second shutoff element 21, allows the conduit 3 and the central opening 12*a* to be stably occluded in all the configurations of the dispenser 1, except for the operating configuration wherein, as described above, the first and second shutoff elements 20 and 21 allow the unidirectional passage of the fluid from the neck 3*b* and from the central opening 12*a*, respectively.

Figure 10A:
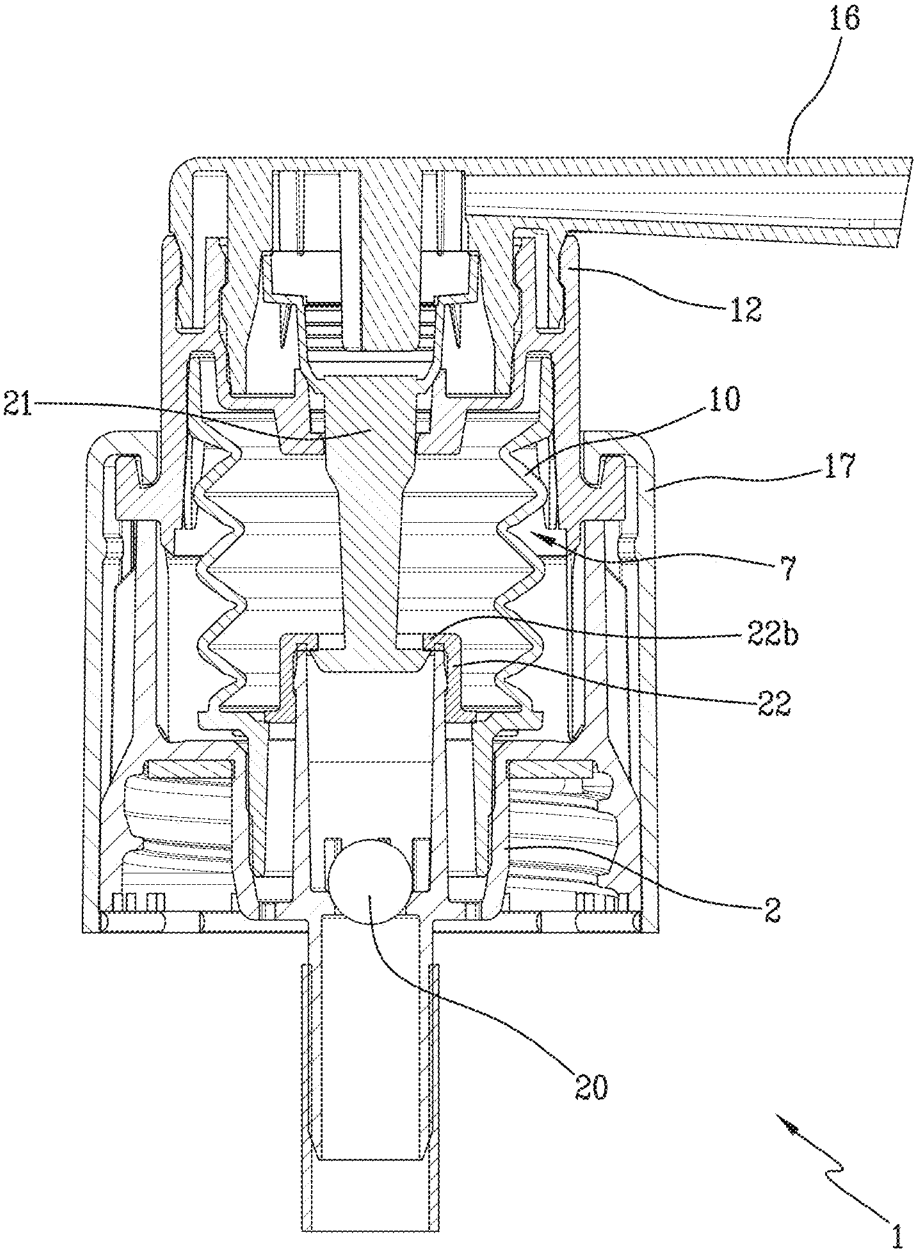
FIGS. 10*a* and 10*b* are schematic representations of a further embodiment of a dispenser according to the invention.
Figure 10B:
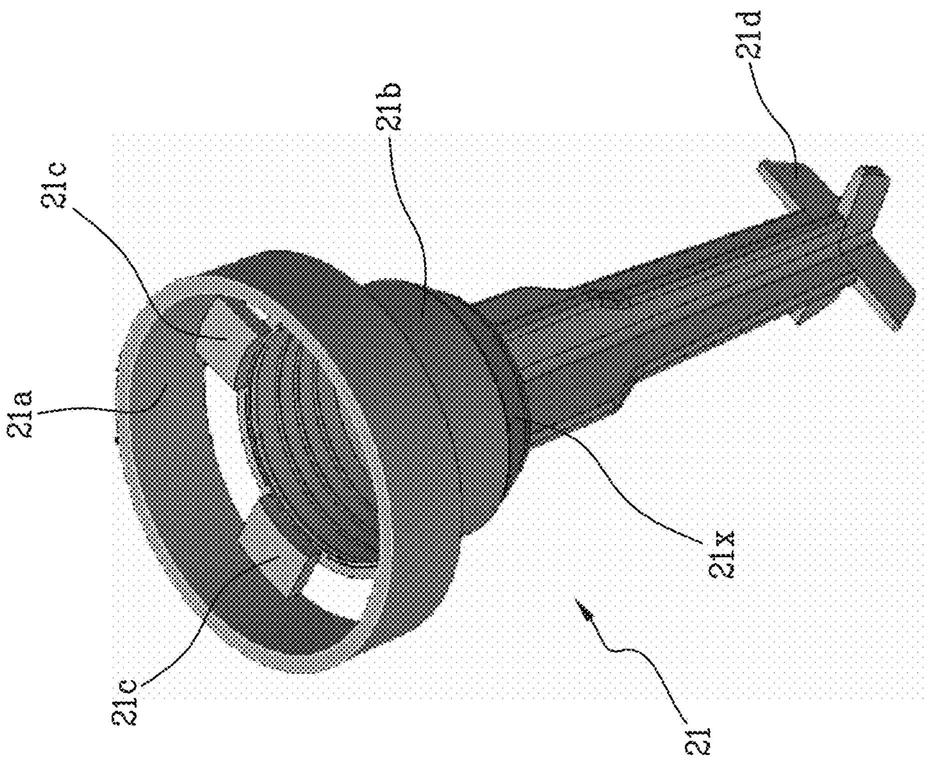

In another non-limiting example embodiment illustrated in FIGS. 10*a* and 10*b*, the sleeve element 22 is made in the form of a perforated lid and is stably anchored to an upper portion of the cylindrical element 3*a*.

Preferably, the perforated lid may be connected or connectable to the cylindrical element 3*a*, and it is therefore provided with anchoring means similar to those which allow the dispenser 1 to anchor to the bottle.

Moreover, the sleeve element 22 has a shoulder 22*b* which partly occludes the conduit 3.

The sealing portion 21*b* of the second shutoff element 21 is equipped with a bottom head 21*d* configured to remain in abutment with the shoulder 22*b* in the non-operating configuration.

In other words, the bottom head 21*d* is shaped in such a way as to hook the shoulder 22*b* of the sleeve element 22, which operates as an end of stroke of the bottom head 21*d*, keeping the sealing portion 21*b* adherent to the central opening 12*a* in such a way as to stably occlude the central opening 12*a*.

Advantageously, the sleeve element 22, acting in conjunction with the second shutoff element 21, makes it possible to occlude the central opening 12*a* in any configuration except for the operating configuration.

In other embodiments, not illustrated, the sleeve element 22 has a shape such that it stably houses the first cutoff element 20, using the portion 22*a* shaped to match, in such a way as to stably occlude the conduit 3 in the dispensing configuration, and such as to interface with the bottom head 21*d* of the second cutoff element 21 in such a way as to occlude the conduit 3 or the central opening 21*a*.

Advantageously, the dispenser 1 described above is able to overcome the drawbacks of the prior art.

Advantageously, the dispenser 1 described above allows a facilitated recycling due to the material with which the dispenser 1 is made.

Advantageously, the partial grooves 5*a* and 7*b* defining the channel for the passage of the compensation air allow the passage of air when the dispenser 1 is in the operating configuration. In other words, even using a concertina-like deformable element 7, the dispenser 1 according to this invention is able to top-up the volume of fluid extracted.

Advantageously, the dispenser 1 according to the invention has strength properties such as to allow safe dispatch without the use of special protective devices.

Advantageously, the sleeve element 22 and the shutoff elements 20 and 21 hermetically seal the conduit 3 and/or the central opening 12, thus making the dispenser 1 secure and preventing unwanted fluid from escaping.

Moreover, the sleeve element 22 and the shutoff elements 20 and 21 are dimensioned and made in such a way as to optimise operation irrespective of the fluid to be dispensed, making the dispenser 1 versatile and usable with any type of fluid.

The invention claimed is:

1. A dispenser for dispensing a fluid contained in a bottle, made of plastic material, comprising:

a ring nut which can be screwed on the neck of a bottle and having a cylindrical element suitably shaped internally and defining a conduit for sucking fluid from said bottle, a series of holes positioned around said conduit and an inner cylindrical wall equipped with partial grooves; said cylindrical element comprising a neck;

a concertina-like deformable element, defining a return spring of said dispenser, comprising a cylindrical lower projection equipped with relative partial grooves, and side walls defining a dosing chamber of said dispenser, a ring positioned on said ring nut and designed to define with the ring nut a locking system, by means of a reciprocal rotation of said ring and of said ring nut, designed to define an operating configuration and a non-operating configuration of said dispenser; said ring also being hooked to an upper portion of said concertina-like deformable element in such a way as to pull said concertina-like deformable element during said reciprocal rotation in such a way that, in said operating configuration, said partial grooves of said ring nut are aligned and said partial grooves of said concertina-like deformable element so that said partial grooves form, together with said series of holes, a channel for the passage of the compensation air;

a dispensing head, which can be pressed by a user when said dispenser is in said operating configuration, operatively connected to said ring and equipped with a collection chamber designed to collect the fluid flowing out from the dosing chamber of said concertina-like deformable element through a central opening of said ring in such a way as to dispense the fluid through an outlet channel; said collection chamber and said dosing chamber communicating through said central opening of said ring;

a first shutoff element configured to be positioned resting on said neck and to rise in the case of negative pressures of said dosing chamber in such a way as to form together with said neck a check valve entering said dosing chamber;

a second shutoff element integral with said dispensing head and housed movably in said central opening of the ring in such a way as to define a delivery valve between said dosing chamber and said collection chamber; and a sleeve element, coaxial with said cylindrical element, interfering, at least in a supply configuration before a first pressing of the dispensing head, with at least one of said first and second shutoff elements in such a way as to block at least one of said first and second shutoff elements in a fixed position which allows said conduit and/or said central opening to be stably occluded.

2. The dispenser according to claim 1, wherein said first shutoff element has a substantially spherical shape and wherein said neck has a substantially circular ring shape.

3. The dispenser according to claim 2, wherein said second shutoff element comprises:

an anchoring portion designed to be received in a receiving portion of said dispensing head in such a way as to make said second shutoff element and said dispensing head integral with each other;

a sealing portion, having a substantially elongate shape and designed to occlude said central opening, forming a closed configuration of the delivery valve;

a connecting portion, joining said sealing portion to said anchoring portion and configured to allow the movement, by elastic deformation, of said sealing portion relative to said anchoring portion in such a way as to open the delivery valve in the case of a pressure of said dosing chamber greater than a predetermined threshold value.

4. The dispenser according to claim 1, wherein said sleeve element is positioned at least partly inside said cylindrical element.

5. The dispenser according to claim 2, wherein said sleeve element is made in the form of a perforated lid anchored on an upper portion of said cylindrical element.

6. The dispenser according to claim 1, wherein said second shutoff element comprises:

an anchoring portion designed to be received in a receiving portion of said dispensing head in such a way as to make said second shutoff element and said dispensing head integral with each other;

a sealing portion, having a substantially elongate shape and designed to occlude said central opening, forming a closed configuration of the delivery valve;

a connecting portion, joining said sealing portion to said anchoring portion and configured to allow the movement, by elastic deformation, of said sealing portion relative to said anchoring portion in such a way as to open the delivery valve in the case of a pressure of said dosing chamber greater than a predetermined threshold value.

7. The dispenser according to claim 6, wherein said second shutoff element is equipped with a bottom head interfering radially with a portion of said sleeve element for selectively sealing said conduit in a non-operating configuration of the dispensing head.

8. The dispenser according to claim 6, wherein said sealing portion is equipped with a bottom head configured to remain in contact with a shoulder of said sleeve element in a non-operating configuration of the dispensing head.

9. The dispenser of claim 6, wherein the anchoring portion is annular.

10. The dispenser according to claim 6, wherein said sleeve element is positioned at least partly inside said cylindrical element.

11. The dispenser according to claim 6, wherein said sleeve element is made in the form of a perforated lid anchored on an upper portion of said cylindrical element.

12. The dispenser according to claim 1, wherein said sleeve element is positioned at least partly inside said cylindrical element.

13. The dispenser according to claim 12, wherein said first shutoff element is retained by interference in said sleeve element in said supply configuration.

14. The dispenser according to claim 13, wherein said second shutoff element, during said first pressing of the dispensing head, is configured for irreversibly pushing said first shutoff element from said sleeve element to said neck.

15. The dispenser according to claim 12, wherein said second shutoff element is equipped with a bottom head interfering radially with a portion of said sleeve element for selectively sealing said conduit in a non-operating configuration of the dispensing head.

16. The dispenser according to claim 12, wherein said sleeve element is made in the form of a perforated lid anchored on an upper portion of said cylindrical element.

17. The dispenser according to claim 1, wherein said sleeve element is made in the form of a perforated lid anchored on an upper portion of said cylindrical element.

18. The dispenser according to claim 1, wherein said sleeve element is made in one piece with said concertina-like deformable element or with said ring nut.

19. The dispenser according to claim 1, wherein said plastic material is polyethylene.

20. The dispenser according to claim 1, wherein said plastic material is a biological plastic produced from non-fossil sources belonging to the polyethylene family.

* * * * *